UNIVERSAL CARBURETOR-MANIFOLD ADAPTOR

Original Filed June 21, 1965

INVENTOR
EDWIN E. LOHN

BY Wilson, Robbins & Anderson
ATTORNEYS

United States Patent Office

Re. 27,378
Reissued May 30, 1972

27,378
UNIVERSAL CARBURETOR-MANIFOLD ADAPTOR

Edwin E. Lohn, 231 S. Peck Drive,
Los Angeles County, Calif. 90212

Original No. 3,366,145, dated Jan. 30, 1968, Ser. No. 465,442, June 21, 1965. Application for reissue June 24. 1970, Ser. No. 49,585
Int. Cl. F15d *1/04*
U.S. Cl. 138—39 6 Claims

Matter enclosed in heavy brackets [ ] appears in the original patent but forms no part of this reissue specification; matter printed in italics indicates the additions made by reissue.

ABSTRACT OF THE DISCLOSURE

[A thick substantially flat plate comprising an adapter body for interconnecting any of a variety of carburetor sizes to any of a variety of engine intake manifold sizes is disclosed. The plate or body defines a plurality of flow ports extending therethrough, which have a conical surface truncated at the flat surfaces of the plate, the conical axes of which converge centrally to intersect at a point removed from said body. Furthermore, the body defines a plurality of sets of quadrature spaces apertures, counter formed to define locking spaces on each side of the body.]

*A plate comprising an adapter body for interconnecting any of a variety of carburetor sizes to any of a variety of engine intake manifold sizes is disclosed. The plate or body defines a plurality of flow parts extending therethrough which have a conical surface truncated at the flat surfaces of the plate. Furthermore, the body defines a plurality of sets of spaced apertures, counterformed to define locking spaces on each side of the body.*

*FIELD OF THE INVENTION*

*The field of art to which the invention pertains includes the field of conduits, particularly of the flow facilitating type.*

*BACKGROUND AND SUMMARY OF THE INVENTION*

This invention relates generally to adapting structure for securing a carburetor body to the intake manifold of an internal combustion engine and more particularly to a unitary adaptor for securing any one of a large number of carburetors to any one of a large number of manifolds.

Although the present invention finds particularly useful application in the field of high performance or experimental engines and in automobile engine hobbyist endeavors; and although, for the sake of clarity and brevity, much of the discussion of examples of the invention presented hereinbelow relate thereto, it is to be understood that the utility and usefulness of the invention is manifest equally advantageously in other applications as well, such as, for example, in high economy and stock automobiles, in marine and other vehicular use, and in stationary or power take-off engines.

In automobile power plant system design, one of the most important and critical criteria in determining power delivery, fuel economy, reliability or any desired optimum between these and other operational aspects of such engines, is the combination of a particular carburetor design with the remainder of the power plant system, or, that is, the engine per se. Consequently a designer, research experimentor, or purchaser for use of engines frequently desires or needs to combine his own choice of carburetor with the remainder of the engine system. The researcher or hobbyist may select his own or many different carburetor-engine combinations for reasons ranging from commercial engine research, for example, to mere intellectual curiosity on the part of a [juvenile] hobbyist. The commercial user purchaser, on the other hand, often selects an engine best suited basically for his needs, and then chooses, for his own particular application, a different optimum between performance and economy thereby requiring a different carburetor from that supplied with the basic engine by the manufacturer of the power plant system.

Accordingly there is a very active practice of adapting carburetors to engines in combinations neither contemplated nor provided for by the engine manufacturer. Furthermore, because of the large number of engine and carburetor manufacturers, *and the constant supply of new carburetors,* and because of the unpredictable desires on the part of the purchaser to combine, for example, extremely large carburetors with extremely small engines and vice versa, it is usually required that the purchaser make or obtain a special and particular adapator apparatus for securing together his particular engine-carburetor combination. This is a troublesome requirement, and often is difficult to satisfy. Furthermore, because of the time and trouble and expense required by the process of adapting a particular carburetor to a particular engine, the user typically settles for a combination of carburetor and engine for which an adaptor may be already on hand or can be readily found, or fabricated, thus comprising the research process of the user's otherwise optimum combination.

Accordingly, it an object of the present invention to provide a carburetor-manifold adaptor apparatus which is not subject to these and other disadvantages and deficiencies of prior art adaptor approaches, techniques, and structures *and which enables the use of new carburetors as they become available without the purchase of a new manifold.*

It is another object to provide such a carburetor-manifold adaptor which universally adapts between a very large number of carburetors and engine manifolds.

It is another object to provide such a carburetor-manifold adaptor apparatus which is structurally rugged and unitary.

It is another object to provide such carburetor-manifold adaptor which, while being a universal adaptor, is relatively inexpensive and comparable in cost to a conventional non-universal adaptor.

It is another object to provide such apparatus which provides smooth transition in fuel-mixture flow between carburetor throat and the manifold ducts irrespective of whether a large carburetor is fitted to a small engine or a small carburetor to a large engine.

Very briefly, these and other objects and advantages are achieved in accordance with the structural aspects of one example of the invention which includes a thick, substantially flat plate adaptor body which is formed with a plurality of sets of retainer holes about its periphery at different radial distances from the center of the adaptor body. The combination of retainer holes thusly provided include sets of holes which mate with corresponding respective sets of holes provided in the mounting flanges of a large number of engine intake manifolds. At the same time the different sets of retainer holes also mate with a large number of sets of carburetor bolt-down holes.

Fuel-mixture flow ports are also provided through the thickness of the adaptor body. The ports are provided in the form of truncated cylindrical surfaces, and, in some forms of the invention, conical surfaces whose axes converge or tend toward converging, at a distance from the adaptor body in the direction toward the apexes of the conical surfaces. Thus, in such examples, the ports extend through the adaptor plate body from substantially circular smaller openings, whose centers are more closely spaced on one face thereof, to substantially circular, larger openings, whose centers are more widely spaced on the other face of the adaptor body.

The adaptor is reversible and the ports thusly formed provide in one orientation thereof, a smooth transition from a small carburetor to a large [engine] *manifold*, or, when reversed by turning it over, a transition from a large carburetor to a small [engine] *manifold*.

The retainer holes are of special construction for retaining, flush, when desired, special retainer nuts as for securing the adaptor body to the mounting flange of a manifold and yet providing a flat surface over the retainer nuts for a subsequent sealing, juxtapositioned relationship with the carburetor base.

Further details of the retaining structures and of other novel features and their operation as well as additional objects and advantages of the invention will become apparent and be best understood from a consideration of the following description taken in connection with the accompanying drawing which is presented by way of an illustrative example only, and in which.

Figure 1:
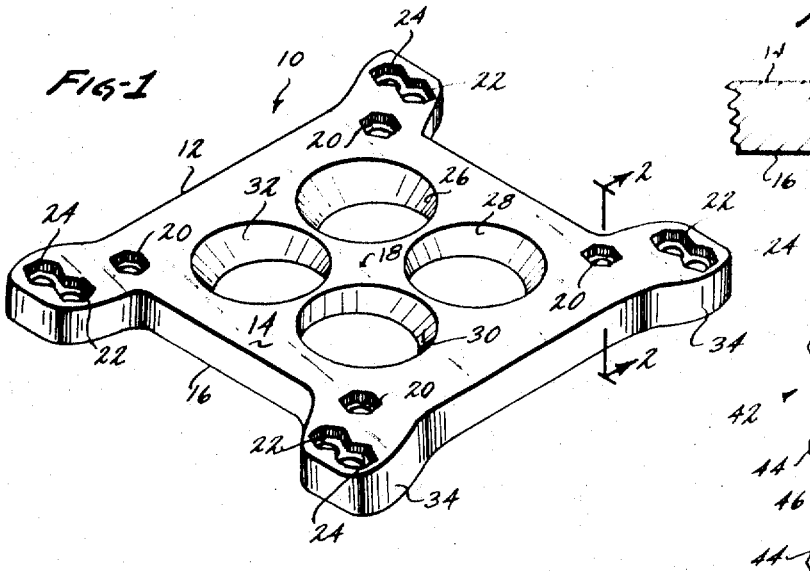
FIG. 1 is a perspective view of a portion of an example of a universal carburetor adaptor constructed in accordance with the principles of the present invention.

With specific reference now to the figures in more detail, it is stressed that the particulars shown are by way of example and for purposes of illustrative discussion only, and are presented in the cause of providing what is believed to be the most useful and readily understood description of the principles and structural concepts of the invention. In this regard no attempt is made to show structural details of the apparatus in more detail than is necessary for a fundamental understanding of the invention, the description taken with the drawing making apparent to those skilled in the arts of internal combustion engines and carburetors in particular, how the special forms of the invention may be embodied in practice. Specifically, the detailed showing is not to be taken as a limitation upon the scope of the invention which is defined in the appended claims forming, along with the drawing, a part of this specification.

In FIG. 1, an example of a universal carburetor adaptor 10 is shown which includes a body member 12 which is substantially in the form of a thick, flat plate having an upper, as viewed in the drawing, surface 14 and a lower surface 16, which are mutually parallel and substantially planar. For reference purposes, of use in the following description, the body member 12 may be considered as having an approximate center designated at 18.

A plurality of sets 20, 22, 24 of retaining apertures are provided through the thickness of the body member 12 as shown. Each of the sets of retaining apertures, in this example, includes four individual apertures, arranged in a substantially square array in a quadrature relationship about the center 18 of the body member 12. Each of the sets comprises apertures which are disposed at a predetermined radial distance from the center 18, with the apertures of the different sets being disposed at a different distance from those of the other sets. Thus the retainer apertures of the set 20 are substantially equidistant from the center 18 at a distance which is less than that of the sets 22, 24. Similarly the individual retainer apertures of the set 24 are disposed at a distance from the center 18 which is greater than that for the apertures of the sets 20, 22, while the radial distance to the retainer apertures of the set 22 from the center 18 is intermediate those of the apertures of the sets 20, 24. Further details of the structure of the retainer apertures will be shown and discussed in connection with FIG. 2 below.

In the example of the invention selected for presentation here as being a presently preferred embodiment thereof, the particular universal carburetor adaptor shown is of the character generally, for adapting four barrel carburetors to internal combustion engines. To particularly advantageously serve this end, the body member 12 of this example of the invention, is shown to be apertured to provide in its central portions, a plurality of four fuel-mixture flow ports 26, 28, 30, 32. These ports in this four barrel arrangement are also disposed in a substantially square array in quadrature about the center 18 of the body member 12. Of particular note however, is the fact that each of the mixture flow ports is formed substantially in the form of a conical surface which is truncated by the upper and lower surfaces 14, 16 of the body member, so that the intersection of the conical surface of each of the fuel mixture flow ports with the upper or lower surface of the body member defines a substantially circular opening therethrough.

It may further be noted that in this example the apexes of the conical surfaces would be disposed at a distance from the body member 12 in the direction therefrom to the surface 16, so that the diameters of the flow port openings in the lower surface 16 are smaller than the diameters of the flow port openings through the upper surface 14. It may further be pointed out that the axes of the four conical surfaces forming the fuel mixture flow ports, are transverse to the surfaces 14, 16, but are not necessarily normal thereto; and in a presently preferred arrangement of the invention, these axes would converge or tend to converge at a distance from the body member 12 to the side indicated by the surface 16 thereof. By this means the centers of the substantially circular openings of the fuel mixture flow ports in the surface 16 are more closely spaced than are those of the substantially circular openings in the upper surface 14.

The advantageous purpose of the axes being thusly divergently oriented, is to provide a smooth transitional flow between a large carburetor and a small engine intake manifold or, similarly, from a small carburetor to a large engine manifold. In other words, if the fuel mixture flow output from a small carburetor is to be expanded into the ducting of a larger intake manifold, each of the fuel mixture flow ports by its conical shape begins the expansion process, while the diverging of the conical axes of the array of ports begins the process of smoothly distributing the carburetor output to the entire internal regions of the intake manifold.

For convenience in the use of the adaptor as well as for purposes of maximizing accessibility to the carburetor and manifold of the engine system and to preserve raw materials, the sets of retaining apertures 20, 22, 24 may be formed in ear-like extensions 34 of the body member 12.

Figure 2:
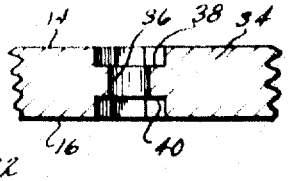
FIG. 2 is a cross-sectional view of the structure of FIG. 1 taken along the sectional view reference lines 2—2 thereof.

Referring to FIG. 2, the sectional view through one of the retaining apertures of the set 20 formed through the root portion of one of the ear-like extensions 34, shows that the retainer aperture includes a depression having a short, regular hexagonal prism shape, the axis of which is normal in the upper surface 14 and which extends therefrom into the thickness of the body member 12, by a distance which is approximately one-fourth to one-third of the thickness thereof. A similar hexagonal depression coaxial with the first extends upwardly into the body member 12 from the lower surface 16. The two hexagonal portions are joined by a coaxial reduced diameter cylindrical portion 36 which forms, at its intersections with the hexagonal portions, a pair of retaining shoulders 38, 40.

Figure 3:
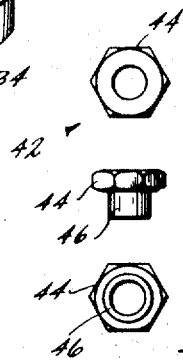
FIG. 3 is a group of three elevational views of an example of a retaining nut portion of a universal carburetor adaptor combination constructed in accordance with the principles of the present invention.

Referring to FIG. 3, an example of a retainer nut 42 is shown which is particularly adapted to be received and retained by the retainer aperture shown in FIG. 2, whether inserted from the surface 16 or the surface 14. The retainer nut 42 includes a hexagonal portion 44 having a length approximately equal to the depth of the hexagonal portions of the retainer aperture of FIG. 2, and a reduced diameter cylindrical portion 46, the outer diameter of which is approximately equal to the diameter of the cylindrical portion 36 of the retainer aperture of FIG. 2. Accordingly, the retainer nut 42 may, as indicated above, be inserted into the body member 12 from either of its surfaces 14, 16 with the cylindrical portion 46 being received within the cylindrical portion 36 of the retainer aperture. In this example the entire length of the retainer nut 42 is internally threaded to engage, in a tension supporting relationship, a retaining bolt, as shown in the subsequent figures.

Figure 4:
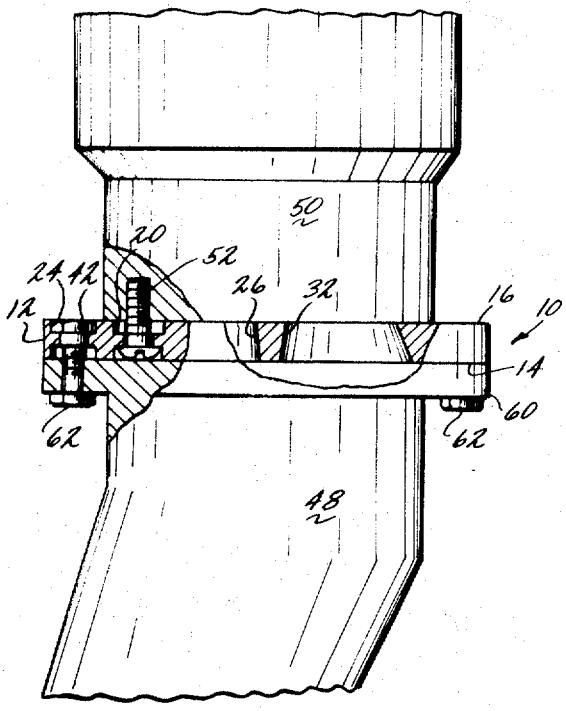
FIG. 4 is a partially elevational sectional view of an example of the invention in a typical utilization in an internal combustion engine application.

Referring to FIG. 4, the universal carburetor adaptor 10 is shown mounted between a manifold 48 and a carburetor 50. In this example, the adaptor is being utilized to form a structural and functional transition between a relatively small carburetor 50 and a relatively large manifold 48. To this end, the body member 12 of the carburetor adaptor 10 is first affixed by a set of mounting bolts 52 inserted through the set of retainer apertures 20, to the base and mounting portions 54 of the carburetor 50. The heads of the bolts 52 are of a length and diameter such that they are totally recessed within the retaining apertures 20.

The body member 12 of the adaptor 10 is, for such a utilization as here pictured, mounted with the surface 14 in the downward position and the surface 16 in the upward position, so that the fairing of the flow ports, such as 26, 32 is, as shown, from the smaller carburetor expanding into the larger manifold. With the adaptor body member 12 thusly affixed to the carburetor 50, the adapted assembly may then be secured to the mounting flange 60 of the manifold 48, by means of a set of mounting bolts 62 which pass through and engage retainer nuts 42 within the set of retainer apertures 24. When desired or advisable, appropriate gasoline sealing gaskets may be compressively retained between the planar surfaces of the adaptor body member 12 and the respectively juxtaposed ones of the carburetor manifold.

Figure 5:
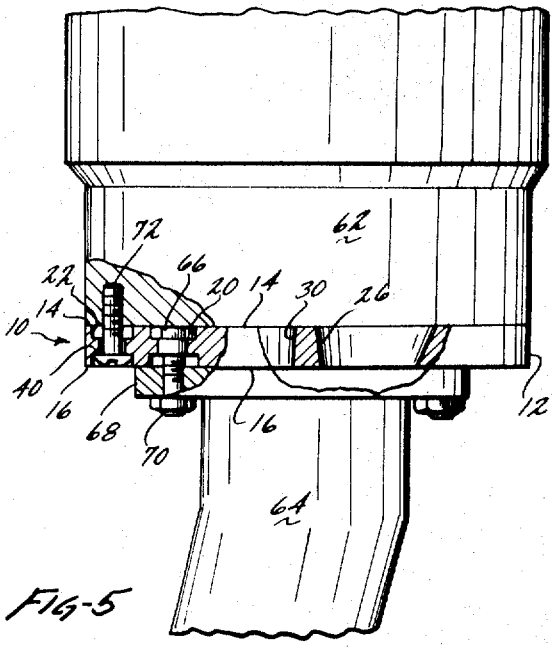
FIG. 5 is a view like that of FIG. 4 showing the same example of the invention in an alternative utilization.

Referring to FIG. 5, a utilization of the universal carburetor adaptor 10 is illustrated, in which a relatively large carburetor 62 is secured to a relatively small intake manifold 64. In such a utilization the surface 14 of the body member 12 is mounted toward the carburetor 62 while the surface 16 is mounted in juxtaposition with the manifold 64. In this manner the fuel mixture flow ports are seen to be in an orientation such as to cause the initiating of a convergence of the fuel from the large carburetor into the small confines of the manifold 64. In this utilization, hexagonal head retaining bolts 66 may be utilized in a manner such that the hexagonal heads are retained rotationally as well as longitudinally by the hexagonal retaining portion of the retainer apertures of the set 20, while their length extends through a mounting flange 68 of the manifold 64, where a set of matingly threaded nuts 70 may be firmly secured thereto. The body of the carburetor 62 may similarly be firmly affixed to the body member 12 of the carburetor adaptor by a set of mounting screws 72 which pass through the retaining apertures of the set 22, in this example, into a corresponding set of threaded bolt down means formed in the carburetor body, as shown, while the retaining shoulder 40 of each of the retainer apertures supports the incumbent tension in the mounting screws 72.

There have thus been disclosed a number of examples, and structural aspects thereof, of a universal carburetor adaptor which achieves the objects and exhibits the advantages set forth and discussed hereinabove.

What is claimed is:

1. Universal carburetor-manifold adaptor comprising:

a thick, flat plate body member having first and second substantially planar and mutually parallel surfaces separated by the thickness of said body member;

said body member being formed to define sets of retainer apertures extending normally therethrough and disposed contiguously to the edge periphery thereof, the array disposition of each said set matching that of standard carburetors and engine intake manifolds, each said set having a quadrature array disposition which is different from that of each of the other of said sets;

each of said retaining apertures being formed to include nut and bolt head receiving means counterformed from each of said first and second surfaces into said body member in a manner to form a recessed retaining shoulder for either of said nut and bolt head;

*said body member being formed to define an additional set of retainer apertures extending normally therethrough and spaced inwardly from the edge periphery thereof, said additional set having a quadrature array disposition different from said first mentioned sets and matching that of a standard carburetor and engine intake manifold;*

*each retaining aperture of said additional set being formed to include nut and bolt head receiving means counterformed in each said first and said second surface into said body member in a manner to form a recessed retaining shoulder for either of said nut and bolt head;* said adaptor body member being further apertured to form a plurality of fuel mixture flow ports through a central portion thereof, said flow ports each defining a conical surface truncated by each of said first and second surfaces whereby the conical section formed by the intersection of said conical surface with said first planar surfaces is substantially a circle of first diameter and that of said conical surface with said second planar surface is substantially circular with a diameter larger than said first diameter said ports being defined whereby the conical axes thereof converge at a distance from said body member to the side centrally thereof designated by said first planar surface, *whereby said adaptor is capable of being used with various differently sized carburetor-manifold combinations.*

2. The invention according to claim 1 in which said body member is formed to define four of said fuel mixture flow ports, the conical axes of which tend to converge at a distance from said body member to the side thereof designated said first surface.

3. The invention according to claim 1 in which each of said retainer apertures is formed in the shape of a right prism surface having a regular hexagonal cross-section extending inwardly symmetrically from each of said first and second planar surfaces for a predetermined axial length equal to approximately one-fourth to one-third the thickness of said body member to said retaining shoulder which comprises and is formed by a reduced diameter portion of said retainer aperture and disposed midway between said first and second planar surfaces.

4. The invention according to claim 3 which further includes a plurality of threaded retainer nuts having a hexagonal body portion and a cylindrical, reduced diameter extension portion coaxial therewith formed integrally axially adjacent thereto, said hexagonal portion having an axial length not greater than said predetermined axial length of said right prism portion of each of said retainer apertures, the outer diameter of said reduced diameter portion of said threaded retainer nut being approximately equal to that of said [reducer] *reduced* diameter portion of said retainer aperture, said retainer nut being internally threaded for substantially the total length of both said hexagonal and reduced diameter portions thereof.

*5. The invention according to claim 1 in which each of said retainer apertures is formed with a polygonal cross-section extending inwardly from each of said first and second planar surfaces for a predetermined axial length into said body member to said retaining shoulder which comprises and is formed by a reduced diameter portion of said retainer aperture and disposed between said first and second planar surface.*

*6. The invention according to claim 5 which further includes a plurality of threaded retainer nuts each having a polygonal body portion for mating with a corresponding one of said retainer apertures, and a cylindrical, reduced diameter extension portion coaxial therewith formed integrally axially adjacent thereto, said polygonal portion having an axial length not greater than said predetermined axial length of a corresponding one of said retainer apertures, the outer diameter of said reduced diameter portion of said threaded retainer nut being approximately equal to that of said reduced diameter portion of said retainer aperture, said retainer nut being internally threaded.*

References Cited

The following references, cited by the Examiner, are of record in the patented file of this patent or the original patent.

UNITED STATES PATENTS

| | | | |
|---|---|---|---|
| 922,755 | 5/1909 | Davis | 285—405 |
| 1,029,691 | 6/1912 | Kirkwood | 48—180 C X |
| 1,448,151 | 3/1923 | Reeves | 48—180 |
| 1,742,052 | 12/1929 | Anderson | 151—44 X |
| 3,114,669 | 12/1963 | Herbst | 123—52 M X |
| 1,515,408 | 11/1924 | Puffer | 138—40 |
| 1,704,939 | 3/1929 | Gravel | 285—178 X |
| 2,072,893 | 3/1937 | Lee | 285—177 |
| 2,377,852 | 6/1945 | Bliffert | 138—40 X |
| 2,760,371 | 8/1956 | Borden | 138—40 X |
| 3,075,559 | 1/1963 | Sharp et al. | 138—37 |
| 3,128,794 | 4/1964 | Boucher et al. | 138—37 |

FOREIGN PATENTS

| | | | |
|---|---|---|---|
| 874,088 | 4/1942 | France | 48—180 |
| 207,296 | 3/1957 | Australia. | |

HERBERT F. ROSS, Primary Examiner

U.S. Cl. X.R.

48—180